United States Patent [19]

Plesniarski

[11] 3,995,885
[45] Dec. 7, 1976

[54] RESTRAINT BELT SYSTEM WITH COMFORT CLAMP ASSEMBLY
[75] Inventor: Edward J. Plesniarski, Warren, Mich.
[73] Assignee: General Motors Corporation, Detroit, Mich.
[22] Filed: Nov. 24, 1975
[21] Appl. No.: 634,856
[52] U.S. Cl. .............................. 280/747; 297/388; 297/389
[51] Int. Cl.$^2$ ......................................... B60R 21/10
[58] Field of Search ........... 280/744, 747; 297/385, 297/388, 389; 180/82 C; 33/138

[56] References Cited
UNITED STATES PATENTS

| | | | |
|---|---|---|---|
| 421,133 | 2/1890 | Grierson | 33/138 |
| 3,856,351 | 12/1974 | Garvey | 280/747 X |
| 3,866,975 | 2/1975 | Fricko | 280/744 |
| 3,929,351 | 12/1975 | Fricko | 280/744 |
| 3,930,682 | 1/1976 | Booth | 297/388 |

Primary Examiner—Robert R. Song
Assistant Examiner—Michael J. Forman
Attorney, Agent, or Firm—Charles E. Leahy

[57] ABSTRACT

A comfort clamp assembly for a vehicle occupant restraint system clamps the shoulder belt against retraction by the shoulder belt retractor so that the belt can be positioned at a nontensioned length with respect to the chest of the seat occupant. According to the invention a clamp lever is pivotally mounted on a guide member and is selectively movable between a belt clamping position and an unclamping position. A spring acts between the clamp lever and the guide member and goes overcenter upon pivotal movement of the clamp lever between the belt clamping position and the unclamping position so that the tension of the spring acts to maintain the clamp lever at its set position.

3 Claims, 4 Drawing Figures

RESTRAINT BELT SYSTEM WITH COMFORT CLAMP ASSEMBLY

BACKGROUND OF THE INVENTION

The invention relates generally to restraint belt systems for use in motor vehicles and more particularly relates to a comfort clamp assembly which relieves the tension on a shoulder belt.

Motor vehicle occupant restraint belt systems generally utilize a restraint belt of webbing material which is disposed across both the occupant's lap and chest so as to prevent movement of the upper torso as well as movement of the lower portion of the torso. The ends of the lap and shoulder belts are generally received by belt retractors so as to wind the belts to stored positions within the retractors when the belts are not in use. This winding stores the unused belts and gives the vehicle an aesthetically appealing appearance. These retractors have been of the automatic locking type so as to lock the belt against pull out upon the initial winding of the belt after being pulled from a fully stored condition. These retractors have also been of the inertia type so that the belt is locked against pull out in response to abrupt belt pulls and/or in response to abrupt vehicle acceleration or deceleration.

Various devices and arrangements have been utilized in vehicle occupant restraint belt systems to prevent the winding bias of the belt retractor from applying tension directly across the occupant's body. U.S. patents Garvey, U.S. Pat. No. 3,856,351 and Fricko, U.S. Pat. No. 3,866,975 are assigned to the assignee of this invention and disclose plastic comfort clips which are adjustably positioned along the length of the shoulder belt and engage a stop through which the shoulder belt extends to prevent the retractor of the shoulder belt from tensioning the shoulder belt across the chest of the occupant.

SUMMARY OF THE INVENTION

The present invention provides an improved vehicle occupant resistant belt system wherein a comfort clamp assembly is provided which clamps the shoulder belt against tensioning across the chest of an occupant by a retractor mounted on the vehicle body. According to the invention, a guide member is located on the vehicle body toward the shoulder belt retractor with respect to the shoulder of the seat occupant. The guide member has a wall defining an aperture through which the shoulder belt passes and which allows the shoulder belt to be normally freely pulled in either direction therethrough so as not to impede movement of the shoulder belt and its tensioning across the chest of the occupant by the retractor. A clamp lever has an end engageable with the shoulder belt and is pivotally mounted on the guide member for movement between a belt clamping position and an unclamping position. A spring acts between the clamp lever and guide member and goes overcenter upon pivotal movement of the clamp lever between the belt clamping position and the unclamping position so that the tension of the spring acts to maintain the clamp lever at its then existing position. The spring holds the clamp lever in the belt clamping position with a force sufficient to clamp the belt between the end of the clamp lever and the wall of the guide member with sufficient force to prevent the shoulder belt retractor from pulling the shoulder belt through the guide member so that the belt can be positioned at a nontensioned length across the chest of the occupant. When the occupant extends the shoulder belt, the shoulder belt moves the clamp lever from the belt clamping position to the unclamping position, thereby causing the spring to go overcenter and maintain the clamp lever in the unclamping position. The belt tensioning effort of the retractor is thereby restored to retract the shoulder belt in tension across the chest of the seat occupant or retract the belt to the stored position when the lower end of the belt is disengaged from the vehicle body. The guide member and clamp lever may be mounted on the seat back, a headrest, the roof, the door pillar or elsewhere on the vehicle body.

One feature of the invention is that a spring biased clamp lever clamps a shoulder belt against an apertured guide member so that the belt may be held in a nontensioned length about the chest of the seat occupant. Another feature of the invention is that a clamp lever for holding a shoulder belt against retraction by a shoulder belt retractor is biased by an overcenter spring so that a pull of the belt by the seat occupant will move the clamp lever to a belt unclamping position where it is maintained by the overcenter spring until manually reengaged with the belt by the occupant.

BRIEF DESCRIPTION OF THE DRAWINGS

These and other features, objects and advantages of the vehicle occupant restraint belt system with comfort clamp assembly will be apparent upon consideration of the following description of the preferred embodiment and the appended drawings in which.

DETAILED DESCRIPTION OF THE PREFERRED EMBODIMENT

Figure 1:
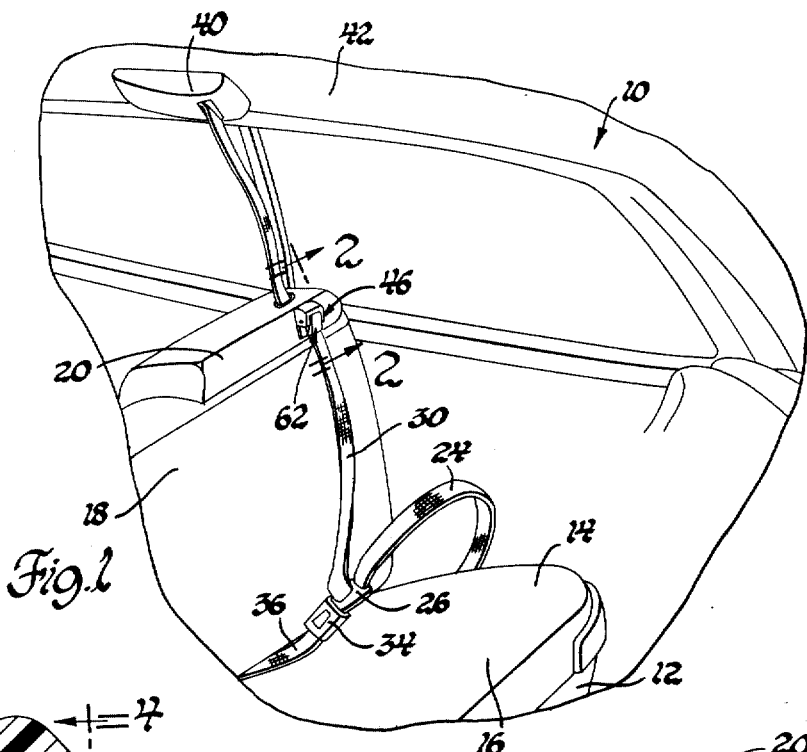
FIG. 1 is a perspective view of the interior of a vehicle body whose front seat utilizes a restraint belt system having a comfort clamp assembly according to the invention.

Referring to FIG. 1 of the drawings, the interior occupant compartment of a vehicle body 10 is shown as including a vehicle floor 12 which conventionally mounts a front bench seat 14. The seat 14 includes a conventional seat cushion 16 and a conventional seat back 18. The upper end of the seat back 18 supports a headrest 20.

The restraint belt system includes a lap belt 24 whose lower end is received by an automatic locking type retractor, not shown, which is positioned on the vehicle floor 12 adjacent the outboard end of the seat cushion 16. This automatic locking retractor normally pulls the lap belt 24 toward a stored position wherein the belt is wound by a spring biased belt reel. The automatic locking retractor allows the lap belt to be unwound only from a fully wound condition. Then upon the initial retracting of the lap belt from the unwound condition, the retractor automatically locks and will not allow the belt to be pulled out further until it is again fully stored within the retractor. The other end of the lap belt 24 is looped through an aperture in a male buckle component or D-ring 26 and is then stitched to itself so as to secure the lap belt 24 to the D-ring 26.

The restraint belt system also includes a shoulder belt 30 whose lower end is likewise looped through an aperture in the D-ring 26 and stitched to itself so as to provide attachment to the D-ring. A buckle assembly 34 for engagement with the D-ring 26 is attached to the vehicle floor 12 behind the seat 14 by a short length of belt 36. The upper end of the shoulder belt 30 is received by an inertia type belt retractor 40 which is mounted on the outboard edge of the vehicle roof 42 to the rear and at the outboard side of the end of the seat 14. The inertia type belt retractor 40 locks in response to abrupt acceleration or deceleration of the vehicle. The inertia type belt retractor 40 pulls the shoulder belt upwardly and rearwardly across the occupant's chest while the lap belt retractor, not shown, pulls the lap belt 24 outwardly across the occupant's lap. The D-ring 26 is engaged with the buckle assembly 34 to retain the belts in the occupant restraining position of FIG. 1.

When the buckle assembly 34 is released, the D-ring 26 is freed from engagement so that the lap belt retractor retracts the lap belt 24 while the shoulder belt retractor simultaneously retracts the shoulder belt 30. When the belts are stored in their respective retractors, the lap and shoulder belts extend generally vertically between the lap belt retractor and the inertia type belt retractor 40.

Figure 2:
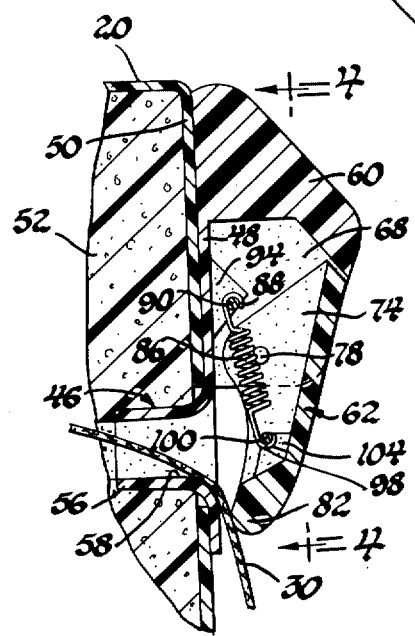
FIG. 2 is an enlarged sectional view of a shoulder belt clamp assembly taken in the direction of arrows 2—2 of FIG. 1, and shown in the belt clamping position.

As best seen in FIGS. 1 and 2, the shoulder belt 30 passes through a guide member 46 provided in the headrest 20. As best seen in FIG. 2, the guide member 46 has a base wall 48 which overlies the vinyl cover 50 of the headrest foam cushion 52. The base wall 48 is attached to the headrest 20 by conventional fasteners which are not shown. Guide member 46 is preferably a plastic injection molding and has an integrally molded sleeve portion 56 which defines an aperture 58 through which the shoulder belt 30 extends and is freely slidable. The guide member 46 thus functions to maintain the shoulder belt 30 in proper relation with the shoulder of the seat occupant and guides the shoulder belt 30 so that it does not chafe against the neck of the occupant.

The guide member 46 includes a housing 60 which mounts a clamp lever 62 for clamping the shoulder belt 30 against the base wall 48 of the guide member 46. As best seen in FIGS. 2 and 4, the housing 60 includes laterally spaced arms 66 and 68 which are disposed adjacent to arms 72 and 74 provided on the clamp lever 62. Pivot pins 76 and 78 are respectively provided in connection between the arms 66 and 68 of the housing 60 and the arms 72 and 74 of the clamp lever 62 so as to mount the clamp lever 62 for pivotal movement. The clamp lever 62 is movable between a clamping position, shown in FIG. 2, wherein a rounded end 82 of the clamp lever 62 clamps the shoulder belt 30 against the base wall 48 of the guide member 46 and an unclamping position of FIG. 3 wherein the belt is freely slidable through the sleeve 56.

A coil spring 86 acts between the clamp lever 62 and the base wall 48 to provide a biasing action on the clamp lever 62. A hook 88 at one end of the spring 86 is engaged over a pin 90 which is integrally molded to the base wall 48 by upstanding legs 92 and 94. A hook 98 at the other end of the spring 86 is engaged over a pin 100 which is integrally molded with the clamp lever 62 and connected therewith by integral legs 102 and 104.

Figure 3:
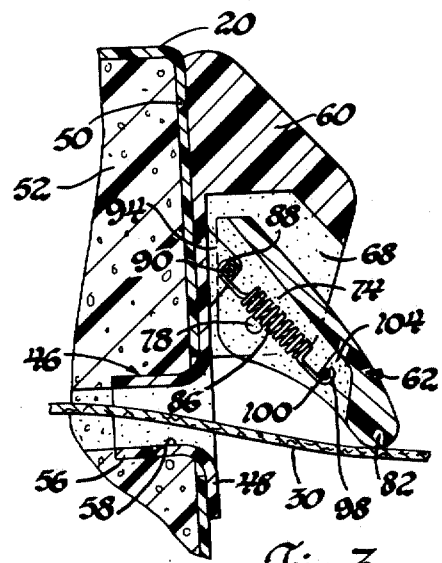
FIG. 3 is a view similar to FIG. 2 but showing the clamp assembly in the unclamping position permitting unimpeded retraction of the shoulder belt.
Figure 4:
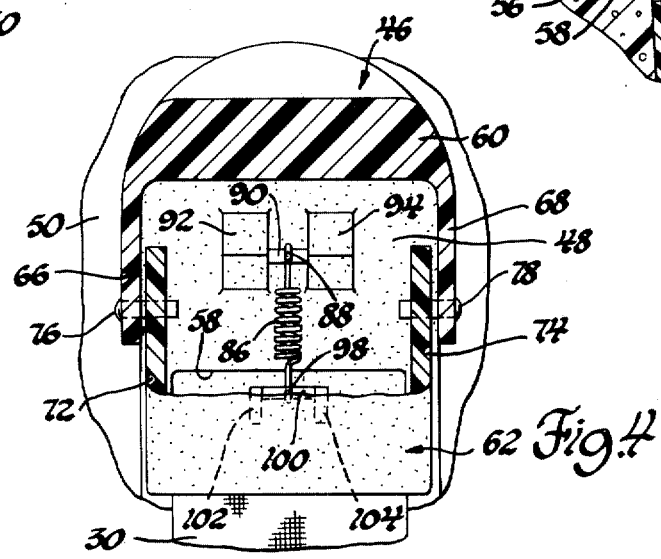
FIG. 4 is a sectional view taken in the direction of arrows 4—4 of FIG. 2.

As best seen by comparing FIGS. 2 and 3, the spring 86 goes overcenter with respect to the axis of the pivot pins 76 and 78 so that the tension force of the spring 86 biases the clamp lever 62 to either its clamping position of FIG. 2 or its unclamping position of FIG. 3.

OPERATION OF THE PREFERRED EMBODIMENT

In operation, when the occupant enters the passenger compartment and is seated on the seat 14, the D-ring 26 is grasped and the lap belt 24 and the shoulder belt 30 extended from their respective retractors until the D-ring 26 can be engaged in the buckle assembly 34. This extension of the belts causes the lap belt 24 to extend over the lap of the seated occupant and the shoulder belt 30 to be extended diagonally across the chest of the occupant. The inertia type belt retractor 40 exerts a winding force on the shoulder belt 30 causing it to be tensioned across the chest of the seated occupant. The clamp lever 62 is normally poised in its unclamping position of FIG. 3 so that the shoulder belt 30 is freely slidable through the sleeve 56 of the guide member 46.

The occupant may, if desired, eliminate the discomfort which may result from the tension on the shoulder belt by manually moving the clamp lever 62 from its unclamping position of FIG. 3 to its clamping position of FIG. 2. As seen in FIG. 2, movement of the clamp lever 62 to the clamping position causes the spring 86 to move overcenter with respect to the pivot pins 76 and 78 so that the rounded end 82 of the clamp lever 62 forces engagement of the shoulder belt 30 against the base wall 48. The spring 86 is selected to provide a clamping force on the clamp lever 62 which is sufficient to frictionally clamp the shoulder belt 30 with a force sufficient to exceed the winding effort of the inertia type belt retractor 40 so that the shoulder belt 30 can be positioned and maintained at a nontensioned relationship with respect to the chest of the occupant.

When the occupant wishes to alight from the vehicle, the clamp can be moved to the unclamping position by merely leaning forward or pulling the shoulder belt 30 so that it pivots the clamp lever 62 from its clamping position of FIG. 2 to its unclamping position of FIG. 3. This movement of the clamp lever 62 causes the spring 86 to be moved overcenter with respect to the pivot pins 76 and 78 so that the clamp lever 62 is held in the unclamping position of FIG. 3.

Thus, it is seen that the invention provides an improved restraint belt system having a clamp assembly so that a shoulder belt can be clamped against retraction by the shoulder belt retractor so as to relieve the tension on a shoulder belt.

What is claimed is:

1. In a vehicle body including an occupant seat having cushion and back portions, a restraint belt system for a seated occupant comprising: a shoulder belt extending generally diagonally across the chest of the seat occupant while in the restraining position, the shoulder belt having a lower end engageable with the vehicle body and an upper end extending over the shoulder of the seat occupant, a retractor mounted on the vehicle body and receiving the upper end of the shoulder belt so as to normally tension the shoulder belt across the chest of the seat occupant and retract the shoulder belt to a stored position upon disengagement of the lower end of the belt from the vehicle body, guide means located on the vehicle body toward the retractor with respect to the shoulder of the seat occupant and slidably receiving the shoulder belt to locate the shoulder belt with respect to the occupant, the guide means allowing the shoulder belt to be freely pulled in either direction therethrough so that movement of the shoulder belt is not impeded and the retractor tensions the shoulder belt across the chest of the seat occupant, clamp means adapted to clamp the belt against movement through the guide member to thereby prevent the shoulder belt retractor from tensioning the shoulder belt across the occupant's chest, said clamp means having a clamp lever adapted to engage the shoulder belt, means pivotally mounting the clamp lever for pivotal movement between a belt clamping position and an unclamping position, spring means acting on the clamp lever and going overcenter upon pivotal movement of the clamp lever between the belt clamping position and the unclamping position so that the tension of the spring means maintains the clamp lever at its then existing position, the spring means holding the clamp lever in the belt clamping position with a force sufficient to clamp the belt with sufficient force to prevent the shoulder belt retractor from retracting the shoulder belt through the guide member, the clamp lever being arranged with respect to the shoulder of the occupant so that forward leaning movement of the shoulder of the occupant causes the belt to move the clamp lever from one of the positions to the other position.

2. In a vehicle body including an occupant seat having cushion and back portions, a restraint belt system for a seated occupant comprising: a shoulder belt extending generally diagonally across the chest of the seat occupant while in the restraining position, the shoulder belt having a lower end engageable with the vehicle body and an upper end extending over the shoulder of the seat occupant, a retractor mounted on the vehicle body and receiving the upper end of the shoulder belt so as to normally tension the shoulder belt across the chest of the seat occupant and retract the shoulder belt to a stored position upon disengagement of the lower end of the belt from the vehicle body, a guide member located toward the retractor with respect to the shoulder of the seat occupant and having a wall defining an aperture through which the shoulder belt passes, the aperture of the guide member allowing the shoulder belt to be freely pulled in either direction therethrough so that movement of the shoulder belt is not impeded and the retractor tensions the shoulder belt across the chest of the seat occupant, a comfort clamp adapted to clamp the belt against the wall of the guide member to thereby prevent the shoulder belt retractor from tensioning the shoulder belt across the occupant's chest, said comfort clamp having a clamp lever with an end adapted to engage the shoulder belt, means pivotally mounting the clamp lever for pivotal movement relative the guide member between a belt clamping position and an unclamping position, spring means acting between the clamp lever and the guide member, said spring means going overcenter upon pivotal movement of the clamp lever between the belt clamping position and the unclamping position so that the tension of the spring means maintains the clamp lever at its then existing position, the spring means holding the clamp lever in the belt clamping position with a force sufficient to clamp the belt between the end of the clamp lever and the wall of the guide member with sufficient force to prevent the shoulder belt retractor from pulling the shoulder belt through the guide member, and extending movement of the shoulder belt by the occupant causing the belt to move the clamp lever from the belt clamping position to the unclamping position and thereby cause the spring means to go overcenter and hold the clamp lever in the unclamping position whereby the belt tensioning effort of the retractor is restored to retract the shoulder belt in tension across the chest of the seat occupant and retract the belt in the stored position when the lower end of the belt is disengaged from the vehicle body.

3. In a vehicle body including an occupant seat having cushion and back portions with a headrest mounted on the back portion, a restraint belt system for a seated occupant comprising: a shoulder belt extending generally diagonally across the chest of the seat occupant while in the restraining position, the shoulder belt having a lower end engageable with the vehicle body and an upper end extending over the shoulder of the seat occupant, a retractor mounted on the vehicle body and receiving the upper end of the shoulder belt so as to normally tension the shoulder belt across the chest of the seat occupant and retract the shoulder belt to a stored position upon disengagement of the lower end of the belt from the vehicle body, a guide member mounted on the headrest and toward the retractor with respect to the shoulder of the seat occupant and having a wall defining an aperture through which the shoulder belt passes, the aperture of the guide member allowing the shoulder belt to be freely pulled in either direction therethrough so that movement of the shoulder belt is not impeded and the retractor tensions the shoulder belt across the chest of the seat occupant, a comfort clamp adapted to clamp the belt against the wall of the guide member to thereby prevent the shoulder belt retractor from tensioning the shoulder belt across the occupant's chest, said comfort clamp having a clamp lever with an end adapted to engage the shoulder belt, means pivotally mounting the clamp lever for pivotal movement relative the guide member between a belt clamping position and an unclamping position, spring means acting between the clamp lever and the guide member, said spring means going overcenter upon pivotal movement of the clamp lever between the belt clamping position and the unclamping position so that the tension of the spring means maintains the clamp lever at its then existing position, the spring means holding the clamp lever in the belt clamping position with a force sufficient to clamp the belt between the end of the clamp lever and the wall of the guide member with sufficient force to prevent the shoulder belt retractor from pulling the shoulder belt through the guide member.

* * * * *